US011102011B2

(12) United States Patent
Qiu

(10) Patent No.: US 11,102,011 B2
(45) Date of Patent: Aug. 24, 2021

(54) DOMAIN NAME MANAGEMENT SCHEME FOR CROSS-CHAIN INTERACTIONS IN BLOCKCHAIN SYSTEMS

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/181,995

(22) Filed: Feb. 22, 2021

(65) Prior Publication Data

US 2021/0176074 A1    Jun. 10, 2021

Related U.S. Application Data

(60) Continuation of application No. 16/791,771, filed on Feb. 14, 2020, now Pat. No. 10,931,462, which is a
(Continued)

(51) Int. Cl.
*H04L 29/06* (2006.01)
*H04L 9/32* (2006.01)
(Continued)

(52) U.S. Cl.
CPC .......... *H04L 9/3247* (2013.01); *H04L 9/0637* (2013.01); *H04L 9/0825* (2013.01);
(Continued)

(58) Field of Classification Search
None
See application file for complete search history.

(56) References Cited

U.S. PATENT DOCUMENTS 7,418,504 B2   8/2008  Larson et al.
7,953,074 B2   5/2011  Pettey et al.
(Continued)

FOREIGN PATENT DOCUMENTS

CN   106210171   12/2016
CN   106991334    7/2017
(Continued)

OTHER PUBLICATIONS

U.S. Appl. No. 16/390,390, filed Apr. 22, 2019, Qiu.
(Continued)

*Primary Examiner* — Jeffery L Williams
(74) *Attorney, Agent, or Firm* — Fish & Richardson P.C.

(57) ABSTRACT

Implementations of the present disclosure include obtaining, from a trusted certificate authority (CA) by an owner of a unified blockchain domain name (UBCDN) of a blockchain instance (a UBCDN owner) in a unified blockchain network, a domain certificate of the UBCDN of the blockchain instance; signing the UBCDN of the blockchain instance; and publishing a UBCDN message of the blockchain instance. The UBCDN of the blockchain instance includes a blockchain domain name and a chain identifier of the blockchain instance. The domain certificate of the UBCDN includes the blockchain domain name, a public key of the UBCDN owner, and a digital signature of the CA on the blockchain domain name and the public key of the UBCDN owner. The UBCDN message includes the UBCDN, a digital signature of the UBCDN owner resulting from the signing the UBCDN, and the domain certificate of the UBCDN.

20 Claims, 8 Drawing Sheets

Related U.S. Application Data division of application No. 16/390,494, filed on Apr. 22, 2019, now Pat. No. 10,680,828, which is a continuation of application No. PCT/CN2018/115921, filed on Nov. 16, 2018.

(51) Int. Cl.
*H04L 9/06* (2006.01)
*H04L 29/12* (2006.01)
*H04L 9/08* (2006.01)

(52) U.S. Cl.
CPC .......... *H04L 9/3239* (2013.01); *H04L 9/3263* (2013.01); *H04L 9/3265* (2013.01); *H04L 9/3268* (2013.01); *H04L 61/1535* (2013.01); H04L 2209/38 (2013.01)

(56) References Cited

U.S. PATENT DOCUMENTS

| | | | |
|---|---|---|---|
| 8,165,586 B2 | 4/2012 | Krishnamurthy et al. | |
| 8,706,739 B1 | 4/2014 | Song et al. | |
| 8,730,925 B2 | 5/2014 | Frank et al. | |
| 9,648,494 B2 | 5/2017 | Norrman et al. | |
| 9,855,785 B1 | 1/2018 | Nagelberg et al. | |
| 10,102,265 B1 | 10/2018 | Madisetti et al. | |
| 10,361,869 B2 | 7/2019 | Gorman | |
| 10,666,445 B2 | 5/2020 | Qiu | |
| 10,680,828 B2 | 6/2020 | Qiu | |
| 10,931,462 B2 | 2/2021 | Qiu | |
| 2003/0191857 A1 | 10/2003 | Terrell et al. | |
| 2013/0262587 A1 | 10/2013 | Munger et al. | |
| 2015/0281174 A1 | 10/2015 | Hwang et al. | |
| 2016/0183156 A1 | 6/2016 | Chin et al. | |
| 2016/0191243 A1 | 6/2016 | Manning | |
| 2016/0261404 A1 | 9/2016 | Ford | |
| 2016/0275461 A1 | 9/2016 | Sprague et al. | |
| 2016/0342978 A1 | 11/2016 | Davis et al. | |
| 2016/0342994 A1 | 11/2016 | Davis | |
| 2016/0344550 A1 | 11/2016 | Anton et al. | |
| 2017/0031874 A1 | 2/2017 | Boudville | |
| 2017/0075938 A1 | 3/2017 | Black et al. | |
| 2017/0188275 A1 | 6/2017 | Kim et al. | |
| 2017/0206522 A1 | 7/2017 | Schiatti et al. | |
| 2017/0236123 A1 | 8/2017 | Ali et al. | |
| 2017/0302663 A1 | 10/2017 | Nainar et al. | |
| 2017/0324738 A1 | 11/2017 | Hari et al. | |
| 2017/0346830 A1 | 11/2017 | Goldfarb et al. | |
| 2017/0366357 A1 | 12/2017 | Pattanaik et al. | |
| 2018/0089041 A1 | 3/2018 | Smith et al. | |
| 2018/0113752 A1 | 4/2018 | Derbakova et al. | |
| 2018/0115416 A1 | 4/2018 | Diehl | |
| 2018/0150647 A1 | 5/2018 | Naqvi et al. | |
| 2018/0212970 A1 | 7/2018 | Chen | |
| 2018/0276668 A1 | 9/2018 | Li et al. | |
| 2018/0278427 A1 | 9/2018 | Thakore et al. | |
| 2018/0287997 A1 | 10/2018 | Li et al. | |
| 2018/0294955 A1 | 10/2018 | Rhie | |
| 2018/0302366 A1 | 10/2018 | Kaliski et al. | |
| 2018/0323980 A1 | 11/2018 | Ahn et al. | |
| 2018/0330386 A1 | 11/2018 | Kim | |
| 2019/0012660 A1 | 1/2019 | Masters | |
| 2019/0013943 A1 | 1/2019 | Maim | |
| 2019/0018984 A1 | 1/2019 | Setty et al. | |
| 2019/0020471 A1 | 1/2019 | Santilli et al. | |
| 2019/0034459 A1 | 1/2019 | Qiu | |
| 2019/0036682 A1 | 1/2019 | Qiu | |
| 2019/0050541 A1 | 2/2019 | Wright et al. | |
| 2019/0050854 A1 | 2/2019 | Yang et al. | |
| 2019/0066068 A1 | 2/2019 | Mitchell et al. | |
| 2019/0073646 A1 | 3/2019 | Wright et al. | |
| 2019/0073670 A1 | 3/2019 | Ganesan et al. | |
| 2019/0080392 A1 | 3/2019 | Youb et al. | |
| 2019/0081793 A1 | 3/2019 | Martino et al. | |
| 2019/0089540 A1 | 3/2019 | Jaatinen | |
| 2019/0089713 A1 | 3/2019 | Leftwich et al. | |
| 2019/0109707 A1 | 4/2019 | Ajoy | |
| 2019/0116034 A1 | 4/2019 | Sengupta | |
| 2019/0116038 A1 | 4/2019 | Sprague | |
| 2019/0122443 A1 | 4/2019 | Stöcker | |
| 2019/0141045 A1 | 5/2019 | Stöcker | |
| 2019/0164153 A1 | 5/2019 | Agrawal et al. | |
| 2019/0166085 A1 | 5/2019 | Li et al. | |
| 2019/0182313 A1 | 6/2019 | Yoo | |
| 2019/0236286 A1 | 8/2019 | Scriber et al. | |
| 2019/0251199 A1 | 8/2019 | Klianev | |
| 2019/0253252 A1 | 8/2019 | Qiu | |
| 2019/0253259 A1 | 8/2019 | Qiu | |
| 2019/0253263 A1 | 8/2019 | Qiu | |
| 2019/0305966 A1 | 10/2019 | Qiu | |
| 2019/0333096 A1 | 10/2019 | Johnson et al. | |
| 2019/0349708 A1 | 11/2019 | Jones | |
| 2019/0392530 A1* | 12/2019 | Kursun | G06F 16/1837 |
| 2020/0007322 A1 | 1/2020 | Weldemariam et al. | |
| 2020/0021446 A1 | 1/2020 | Roennow et al. | |
| 2020/0034395 A1* | 1/2020 | Lu | H04L 9/3239 |
| 2020/0034833 A1 | 1/2020 | Collen et al. | |
| 2020/0042989 A1 | 2/2020 | Ramadoss et al. | |
| 2020/0050690 A1 | 2/2020 | Gaur et al. | |
| 2020/0076576 A1 | 3/2020 | Ahlback et al. | |
| 2020/0081699 A1 | 3/2020 | Majed et al. | |
| 2020/0082126 A1 | 3/2020 | Brown et al. | |
| 2020/0084022 A1 | 3/2020 | Winarski | |
| 2020/0118068 A1 | 4/2020 | Turetsky et al. | |
| 2020/0142884 A1 | 5/2020 | Thapar et al. | |
| 2020/0175156 A1 | 6/2020 | Bhamidipati et al. | |
| 2020/0186364 A1 | 6/2020 | Qiu | |
| 2020/0242249 A1 | 7/2020 | Kumar et al. | |
| 2020/0250694 A1 | 8/2020 | Mock et al. | |
| 2020/0274694 A1* | 8/2020 | Wood | H04L 9/3239 |
| 2020/0280453 A1 | 9/2020 | Qiu | |
| 2021/0036857 A1* | 2/2021 | Qiu | H04L 67/1059 |

FOREIGN PATENT DOCUMENTS

| | | |
|---|---|---|
| CN | 107231299 | 10/2017 |
| CN | 107566337 | 1/2018 |
| CN | 107613041 | 1/2018 |
| CN | 107888562 | 4/2018 |
| CN | 108064444 | 5/2018 |
| CN | 108347486 | 7/2018 |
| CN | 108415784 | 8/2018 |
| CN | 108665365 | 10/2018 |
| CN | 108683630 | 10/2018 |
| CN | 108701145 | 10/2018 |
| CN | 108712257 | 10/2018 |
| CN | 108712506 | 10/2018 |
| JP | 2017204070 | 11/2017 |
| JP | 2018136662 | 8/2018 |
| JP | 2018169829 | 11/2018 |
| JP | 2019185296 | 10/2019 |
| KR | 20100000267 | 1/2010 |
| RU | 2639015 | 12/2017 |
| WO | WO 2017145009 | 8/2017 |
| WO | WO 2018162789 | 9/2018 |

OTHER PUBLICATIONS

U.S. Appl. No. 16/390,494, filed Apr. 22, 2019, Qiu.
U.S. Appl. No. 16/390,586, filed Apr. 22, 2019, Qiu.
U.S. Appl. No. 16/791,771, filed Feb. 14, 2020, Qiu.
U.S. Appl. No. 16/879,117, filed May 20, 2020, Qiu.
Beyers, Hackernoon.com [Online], "Blockchain Domains: What Are They and How Are They Implemented," Sep. 2019, [Retrieved on Nov. 18, 2019], retrieved from: URL<https://hackernoon.com/blockchain-domains-what-are-they-and-how-are-they-implemented-hi2b30hu>, 6 pages.
Buterin, r3.com [online], "Chain Interoperability," Sep. 2016, retrieved on Dec. 16, 2019, retrieved from URL<https://www.r3.com/wp-content/uploads/2017/06/chain_interoperability_r3.pdf>, 20 pages.
Crosby et al., "BlockChain Technology: Beyond Bitcoin," Sutardja Center for Entrepreneurship & Technology Technical Report, Oct. 16, 2015, 35 pages.

(56) References Cited

OTHER PUBLICATIONS

European Extended Search Report in European Patent Application No. 18865360.4, dated Dec. 10, 2019, 8 pages.
Extended European Search Report in European Application No. 18865357.0, dated Dec. 17, 2019, 9 pages.
Extended European Search Report in European Application No. 18865361.2, dated Dec. 16, 2019, 9 pages.
Fromknecht et al., "CertCoin: A NameCoin Based Decentralized Authentication System 6.857 Class Project," Unpublished Class Project, May 2014, 19 pages.
Hardjono et al., "Towards a Design Philosophy for Interoperable Blockchain Systems," MIT Connection Science, Massachusetts Institute of Technology, 2018, 27 pages.
Jin et al., "Towards a Novel Architecture for Enabling Interoperability Amongst Multiple Blockchains," 38th International Conference on Distributed Computing Systems (ICDCS), Jul. 2018, pp. 1203-1211.
Kwon et al., [Cosmos Network] "Cosmos Whitepaper." Jan. 2017, [Retrieved on Dec. 2, 2019], retrieved from: URL<https://cosmos.network/resources/whitepaper>, 30 pages.
Nakamoto, "Bitcoin: A Peer-to-Peer Electronic Cash System," www.bitcoin.org, 2005, 9 pages.
PCT International Search Report and Written Opinion in International Application No. PCT/CN2018/115918, dated Aug. 14, 2019, 7 pages.
PCT International Search Report and Written Opinion in International Application No. PCT/CN2018/115921, dated Aug. 16, 2019, 7 pages.
PCT International Search Report and Written Opinion in International Application No. PCT/CN2018/115926, dated Aug. 15, 2019, 7 pages.
Vo et al., "Internet of Blockchains: Techniques and Challenges Ahead," IEEE International Conference on Internet of Things (iThings), Jul. 2018, pp. 1574-1581.
Wang et al., "Blockchain Router: A Cross-Chain Communication Protocol," Proceedings of the 6th International Conference on Informatics, Enivernment, Energy and Applications, Mar. 2017, pp. 94-97.
Watanabe et al., "Blockchain Contract: A Complete Consensus using Blockchain," IEEE 4th Global Conference on Consumer Electronics (GCCE), Feb. 2016, pp. 577-578.
Westerlund et al., "Towards Distributed Clouds," International Conference on High Performance Computing & Simulation (HPCS), Nov. 2018, pp. 655-663.
Xu et al., "A Pattern Collection for Blockchain-based Applications," Proceedings of the 23rd Eruopean Conference on Pattern Languages of Programs, Jul. 2018, pp. 1-20.
Yang et al., "CVEM: A Cross-chain Value Exchange Mechanism," Proceedings of the 2018 International Conference on Cloud Computing and Internet of Things, Oct. 2018, pp. 80-85.
U.S. Appl. No. 16/390,586, filed Apr. 22, 2019, Honglin Qiu.
U.S. Appl. No. 16/390,494, filed Apr. 22, 2019, Honglin Qiu.
U.S. Appl. No. 16/791,771, filed Feb. 14, 2020, Honglin Qiu.
U.S. Appl. No. 16/390,390, filed Apr. 22, 2019, Honglin Qiu.
U.S. Appl. No. 16/879,117, filed May 20, 2020, Honglin Qiu.

\* cited by examiner

DOMAIN NAME MANAGEMENT SCHEME FOR CROSS-CHAIN INTERACTIONS IN BLOCKCHAIN SYSTEMS

CROSS-REFERENCE TO RELATED APPLICATIONS

This application is a continuation of and claims the benefit of priority of U.S. patent application Ser. No. 16/791,771, filed on Feb. 14, 2020, which is a division of U.S. patent application Ser. No. 16/390,494, filed on Apr. 22, 2019, now U.S. Pat. No. 10,680,828, which is a continuation of PCT Application No. PCT/CN2018/115921, filed on Nov. 16, 2018, and each application is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case (e.g., crypto-currencies). Example types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

Blockchains are used in crypto-currency networks, which enable participants to conduct transactions to buy/sell goods, and/or services using a crypto-currency. A common crypto-currency includes Bitcoin. In crypto-currency networks, record-keeping models are used to record transactions between users. Example record-keeping models include an unspent transaction output (UTXO) model, and account model (also referred to as account-based model or account/balance model).

SUMMARY

Implementations of the present disclosure include computer-implemented methods for a domain name scheme for blockchain systems. More particularly, implementations of the present disclosure are directed to a unified domain name management scheme for cross-chain interactions in blockchain systems.

In some implementations, actions include obtaining, by a computing system, a unified blockchain domain name (UBCDN) message of a blockchain instance, wherein the UBCDN message includes a UBCDN of the blockchain instance, a digital signature of an owner of the UBCDN of the blockchain instance (UBCDN owner) on the UBCDN, and a domain certificate of the UBCDN; verifying whether the domain certificate of the UBCDN is issued by a trusted certificate authority (CA) using a public key of the CA; and verifying whether the UBCDN is issued by the UBCDN owner using a public key of the UBCDN owner. The UBCDN message includes a blockchain domain name and a chain identifier of the blockchain instance uniquely corresponding to the blockchain domain name. The UBCDN of the blockchain instance includes a blockchain domain name of the blockchain instance and a chain identifier of the blockchain instance uniquely corresponding to the blockchain domain name. The blockchain domain name is a unique identifier of the blockchain instance in a unified blockchain network including a plurality of blockchain instances that are communicatively linked by two or more relays. The blockchain domain name includes a human-readable label.

Other implementations include corresponding systems, apparatus, and computer programs, configured to perform the actions of the methods, encoded on computer storage devices.

These and other implementations may each optionally include one or more of the following features:

A first feature, combinable with any of the following features, wherein the computing system serves as a third party of unified blockchain network.

A second feature, combinable with any of the following features, wherein the computing system serves as a client node of a second blockchain instance different from the blockchain instance in the unified blockchain network, and the method further includes: in response to verifying that the UBCDN is issued by the UBCDN owner; and verifying that the domain certificate of the UBCDN is issued by a trusted CA, performing cross-chain transactions between the blockchain instance and the second blockchain instance based on the blockchain domain name of the blockchain instance.

A third feature, combinable with any of the following features, wherein the domain certificate of the UBCDN includes: the blockchain domain name of the blockchain instance; the public key of the UBCDN owner; and a digital signature of the CA on the blockchain domain name of the blockchain instance and the public key of the UBCDN owner.

A fourth feature, combinable with any of the following features, wherein the digital signature of the CA is obtained by the CA signing on the blockchain domain name of the blockchain instance and the public key of the UBCDN owner using a private key of the CA corresponding to the public key of the CA; and wherein verifying whether the domain certificate of the UBCDN is issued by a trusted CA using a public key of the CA includes verifying that the domain certificate of the UBCDN is issued by the CA using the domain certificate, the digital signature of the CA, and the public key of the CA.

A fifth feature, combinable with any of the following features, wherein the digital signature of the owner of the UBCDN is obtained by the owner of the UBCDN singing the UBCDN using a private key corresponding to the public key of the owner of the UBCDN; and wherein verifying whether the UBCDN of the blockchain instance is issued by the UBCDN owner using a public key of the owner of the UBCDN includes verifying that the UBCDN is issued by the owner of the UBCDN using the UBCDN, the digital signature of the owner of the UBCDN, and the public key of the owner of the UBCDN.

In some implementations, actions include obtaining, by an owner of a UBCDN of a blockchain instance (a UBCDN owner) from a trusted certificate authority (CA), a domain certificate of the UBCDN of the blockchain instance, wherein a UBCDN of the blockchain instance includes: a blockchain domain name of the blockchain instance and a chain identifier of the blockchain instance uniquely corresponding to the blockchain domain name, wherein the chain identifier indicates a blockchain network configuration of the blockchain instance; wherein the blockchain domain name is a unique identifier of the blockchain instance in a unified blockchain network including a plurality of blockchain instances that are communicatively linked by two or more relays, and wherein the blockchain domain name includes a human-readable label, wherein the domain certificate of the UBCDN includes: the blockchain domain name of the blockchain instance; a public key of the UBCDN owner; and a digital signature of the CA on the blockchain domain name of the blockchain instance and the public key of the UBCDN owner; signing, by the UBCDN owner, the UBCDN of the blockchain instance; and publishing, by the UBCDN owner, a UBCDN message of the blockchain instance, wherein the UBCDN message includes: the UBCDN of the blockchain instance; a digital signature of the UBCDN owner resulting from the signing the UBCDN; and the domain certificate of the UBCDN.

Other implementations include corresponding systems, apparatus, and computer programs, configured to perform the actions of the methods, encoded on computer storage devices.

These and other implementations may each optionally include one or more of the following features:

A first feature, combinable with any of the following features, further including: identifying an updated chain identifier of the blockchain instance indicating an updated blockchain network configuration of the blockchain instance; signing, by the UBCDN owner, an updated UBCDN of the blockchain instance that includes the blockchain domain name of the blockchain instance and the updated chain identifier of the blockchain instance; and publishing, by the UBCDN owner, an updated UBCDN message of the blockchain instance, wherein the updated UBCDN message includes: the updated UBCDN of the blockchain instance; an updated digital signature of the UBCDN owner resulting from the signing the updated UBCDN; and the domain certificate of the UBCDN.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
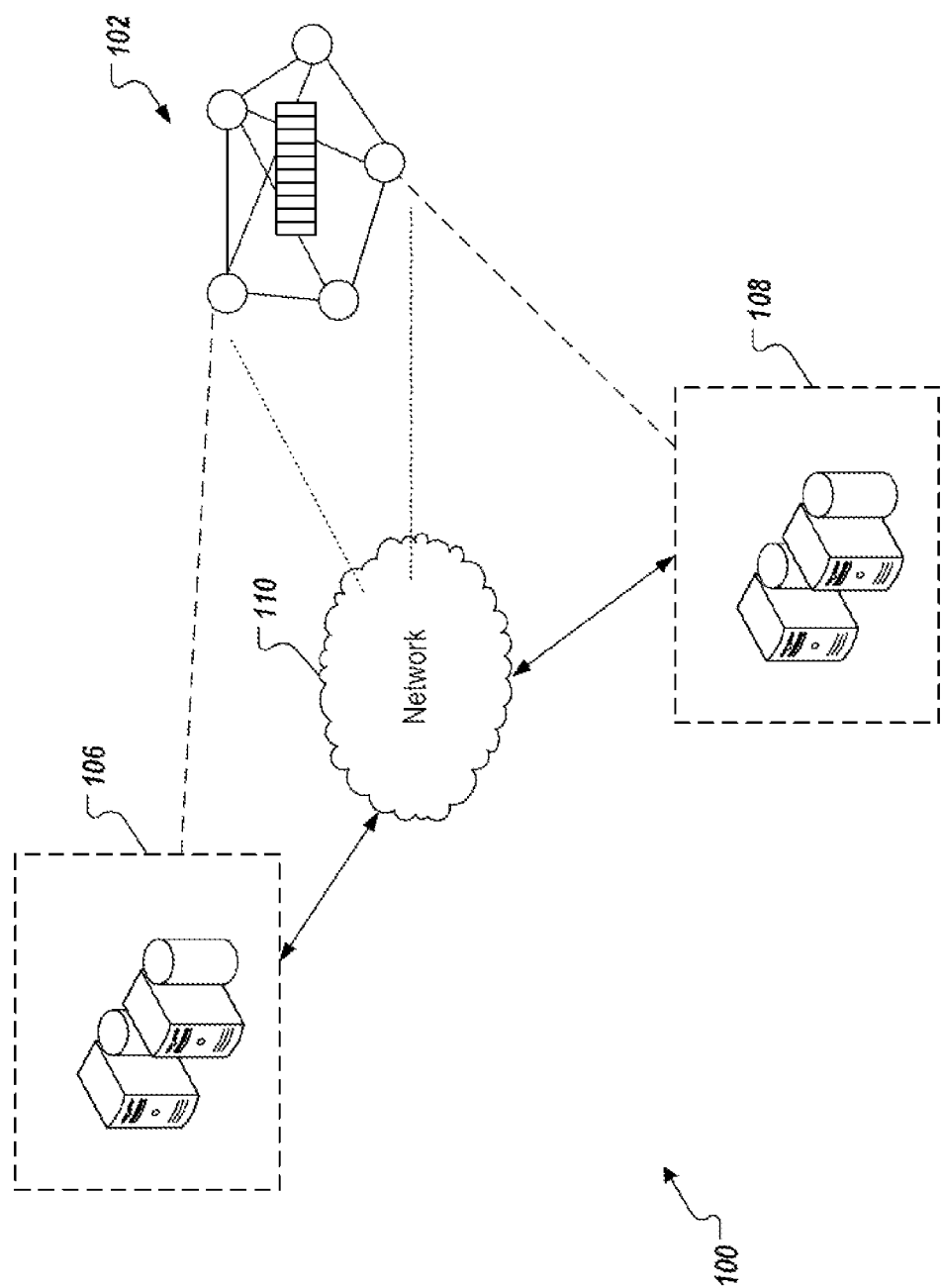
FIG. 1 depicts an example environment that can be used to execute implementations of the present disclosure.

Implementations of the present disclosure include computer-implemented methods for a domain name scheme for blockchain systems. More particularly, implementations of the present disclosure are directed to a unified domain name management scheme for cross-chain interactions in blockchain systems.

In some implementations, actions include obtaining, by a computing system, a unified blockchain domain name (UBCDN) message of a blockchain instance, wherein the UBCDN message includes a UBCDN of the blockchain instance, a digital signature of an owner of the UBCDN of the blockchain instance (UBCDN owner) on the UBCDN, and a domain certificate of the UBCDN; verifying whether the domain certificate of the UBCDN is issued by a trusted certificate authority (CA) using a public key of the CA; and verifying whether the UBCDN is issued by the UBCDN owner using a public key of the UBCDN owner. The UBCDN message includes a blockchain domain name and a chain identifier of the blockchain instance uniquely corresponding to the blockchain domain name. The UBCDN of the blockchain instance includes a blockchain domain name of the blockchain instance and a chain identifier of the blockchain instance uniquely corresponding to the blockchain domain name. The blockchain domain name is a unique identifier of the blockchain instance in a unified blockchain network including a plurality of blockchain instances that are communicatively linked by two or more relays. The blockchain domain name includes a human-readable label.

In some implementations, actions include obtaining, by an owner of a UBCDN of a blockchain instance (a UBCDN owner) from a trusted certificate authority (CA), a domain certificate of the UBCDN of the blockchain instance, wherein a UBCDN of the blockchain instance includes: a blockchain domain name of the blockchain instance and a chain identifier of the blockchain instance uniquely corresponding to the blockchain domain name, wherein the chain identifier indicates a blockchain network configuration of the blockchain instance; wherein the blockchain domain name is a unique identifier of the blockchain instance in a unified blockchain network including a plurality of blockchain instances that are communicatively linked by two or more relays, and wherein the blockchain domain name includes a human-readable label, wherein the domain certificate of the UBCDN includes: the blockchain domain name of the blockchain instance; a public key of the UBCDN owner; and a digital signature of the CA on the blockchain domain name of the blockchain instance and the public key of the UBCDN owner; signing, by the UBCDN owner, the UBCDN of the blockchain instance; and publishing, by the UBCDN owner, a UBCDN message of the blockchain instance, wherein the UBCDN message includes: the UBCDN of the blockchain instance; a digital signature of the UBCDN owner resulting from the signing the UBCDN; and the domain certificate of the UBCDN.

To provide further context for implementations of the present disclosure and, as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with the Bitcoin crypto-currency network, blockchain is used herein to generally refer to a DLS without reference to any particular use case. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. An example public blockchain network includes the Bitcoin network, which is a peer-to-peer payment network. The Bitcoin network leverages a distributed ledger, referred to as blockchain. As noted above, the term blockchain, however, is used to generally refer to distributed ledgers without particular reference to the Bitcoin network.

In general, a public blockchain network supports public transactions. A public transaction is shared with all of the nodes within the public blockchain network, and is stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. An example consensus protocol includes, without limitation, proof-of-work (POW) implemented in the Bitcoin network.

In general, a private blockchain network is provided for a particular entity, which centrally controls read and write permissions. The entity controls, which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the present disclosure are described in further detail herein with reference to a consortium blockchain network. It is contemplated, however, that implementations of the present disclosure can be realized in any appropriate type of blockchain network.

Implementations of the present disclosure are described in further detail herein in view of the above context. More particularly, and as introduced above, implementations of the present disclosure are directed to a domain name scheme for cross-chain interactions in blockchain systems.

Various blockchain platforms, environments, or products have been developed based on different blockchain technologies. Example blockchain products include Ethereum and Bitcoin. The current blockchain network includes multiple blockchain instances deployed based on the different blockchain products. For example, the current blockchain network includes various blockchain instances such as public blockchains, private blockchains, or consortium blockchains that are developed based on Ethereum or Bitcoin technologies.

The current access mode of each blockchain instance requires access from a client node (also referred to as a client terminal) of the blockchain or its technical components such as SDKs. In order to accurately connect to a specific blockchain instance, the client needs to load its blockchain network configurations. These blockchain network configurations are typically hash, member certificates, etc. These configurations are unreadable to humans and it is difficult to identify which chains the configurations identify.

The present disclosure provides a domain name scheme for the blockchain network. Specifically, a unified blockchain domain name (UBCDN) is provided to serve as a unique identifier of each blockchain instance (also referred to as a blockchain network instance or a chain) in the blockchain network. A blockchain instance can be, for example, an implementation or deployment of a blockchain based on a blockchain platform or technology (e.g., Ethereum). Each UBCDN uniquely binds a domain name of a blockchain instance (also referred to as a blockchain domain name) with a corresponding network configuration of the blockchain instance (also referred to as a blockchain network configuration). In some implementations, the blockchain network configuration can be represented or indicated by a chain identifier. A client node of a blockchain instance can obtain a corresponding blockchain network configuration by parsing the UBCDN to identify the chain identifier. Based on the blockchain network configuration, the client node can link to, or otherwise access, to the specific blockchain instance.

The described domain name scheme can provide a unified protocol for interactions between blockchain systems in a unified (or global) blockchain network that includes multiple or all blockchain instances deployed, based on different blockchain products or technologies. All blockchain instances in the unified blockchain network follow the same domain name scheme and be assigned unique UBCDNs. In some implementations, each blockchain instance in the unified blockchain network is assigned a single UBCDN that can be recognized by all the blockchain instances in the unified blockchain network, regardless of different platforms, technologies, or relays that are used in the unified blockchain network. In some implementations, the UBCDN defines a realm of administrative autonomy, authority or control of a blockchain instance within the unified blockchain network. In some implementations, the unified blockchain network can be regarded as a counterpart of the Internet in the IP network, while the UBCDN can be regarded as a mapping of a domain name of an IP resource in the IP network with an IP address of the IP resource.

Each blockchain instance in the unified blockchain network can be uniquely identified by a corresponding UBCDN so as to facilitate multi-chain or cross-chain communications. For example, unlike existing cross-chain implementations such as COSMOS, that uses a relay chain for cross-chain interactions, in which each blockchain is assigned an identifier (ID) within the relay chain network but the ID only has a local scope and cannot be reused in other relay chain networks, in the described domain name scheme, the UBCDN can be used and is recognizable globally by all blockchain instances in the unified blockchain network, despite how many relay chains are included in the unified blockchain network.

Moreover, the described domain name scheme simplifies the identification or addressing protocol for cross-chain interactions in blockchain systems. For example, in the described domain name scheme, a single UBCDN is sufficient to uniquely identify a blockchain instance and is recognizable globally by all blockchain instances in the unified blockchain network for interactions among different blockchain networks, whereas in COSMOS a blockchain instance is assigned multiple different IDs when the blockchain instance joins multiple relay chains for the blockchain instance to interact with other blockchains.

Furthermore, the UBCDN can include a human-readable identifier or label, helping users to memorize and reach a blockchain instance easily, and thus promoting adoption or use of the blockchain instance. As an example, owners or operators of public blockchains, private blockchains, or consortium blockchains can choose blockchain domain names that correspond to their names, helping users to remember the identifiers of the blockchain instances, and further facilitating translation, resolution, or otherwise identification of the chain identifiers corresponding to the blockchain domain names, expediting cross-chain interactions in the unified blockchain network.

Besides providing easily recognizable and memorizable names to identify blockchain instances, the UBCDN allows a blockchain instance to keep its blockchain domain name even though the underlying network configuration of the blockchain instance is changed (for example, by system updating or moving or migrating to a different physical location in the address topology of the network). In the event of such a change or update, the chain identifier of the blockchain instance can be changed while the blockchain domain name can remain the same. The UBCDN owner can change the mapping of the blockchain domain name to the updated chain identifier and allow others (e.g., other blockchain instances or client nodes) to use the same blockchain domain name to address and access the blockchain instance.

FIG. 1 depicts an example environment 100 that can be used to execute implementations of the present disclosure.

In some examples, the example environment 100 enables entities to participate in a consortium blockchain network 102. The example environment 100 includes computing devices or systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
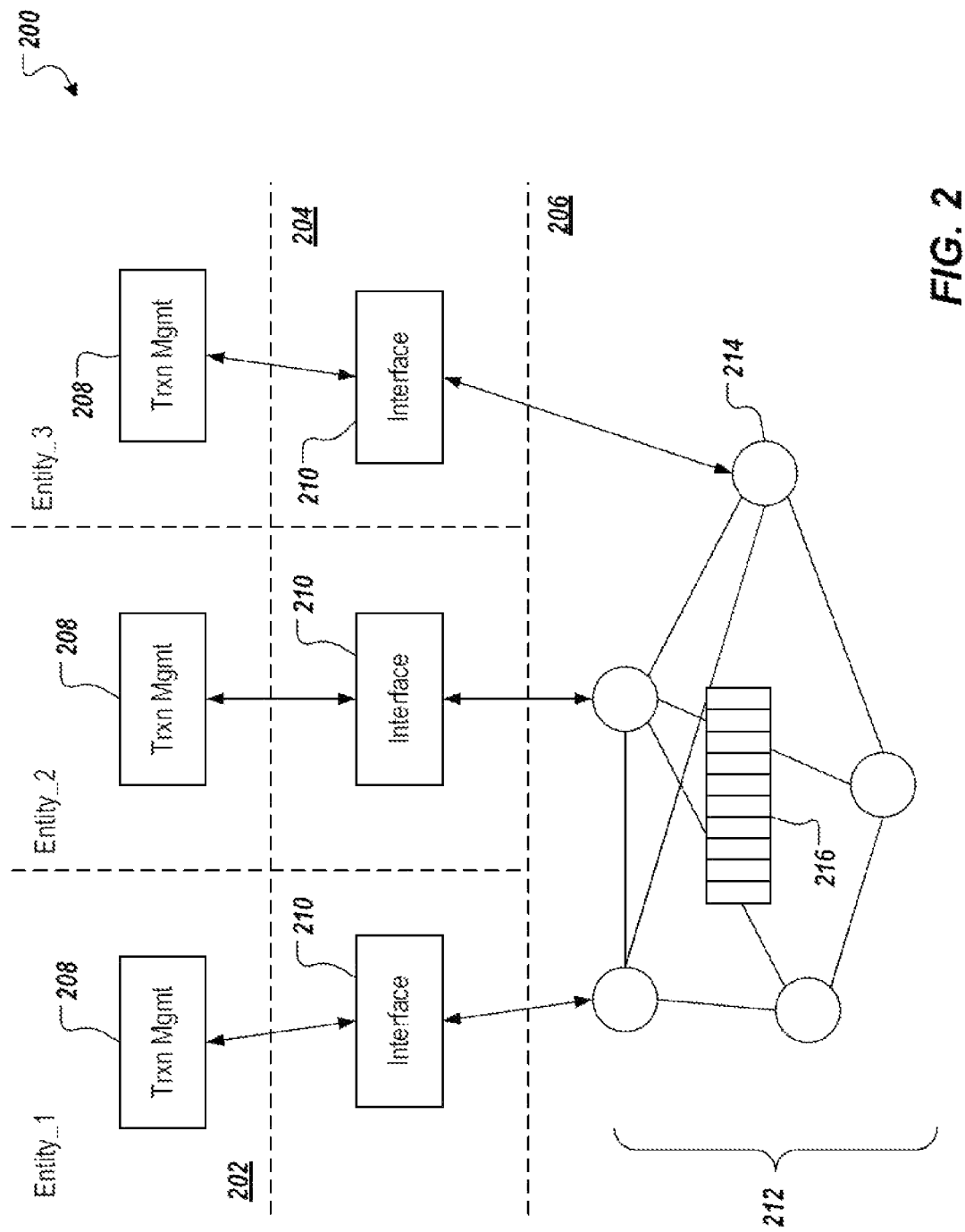
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an entity layer 202, a hosted services layer 204, and a blockchain network layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes interfaces 210 for each transaction management system 208. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides a communication connection between a respective transaction management system 208, and the blockchain network layer 206. More particularly, the interface 210 communicates with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a number of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the consortium blockchain network.

Figure 3:
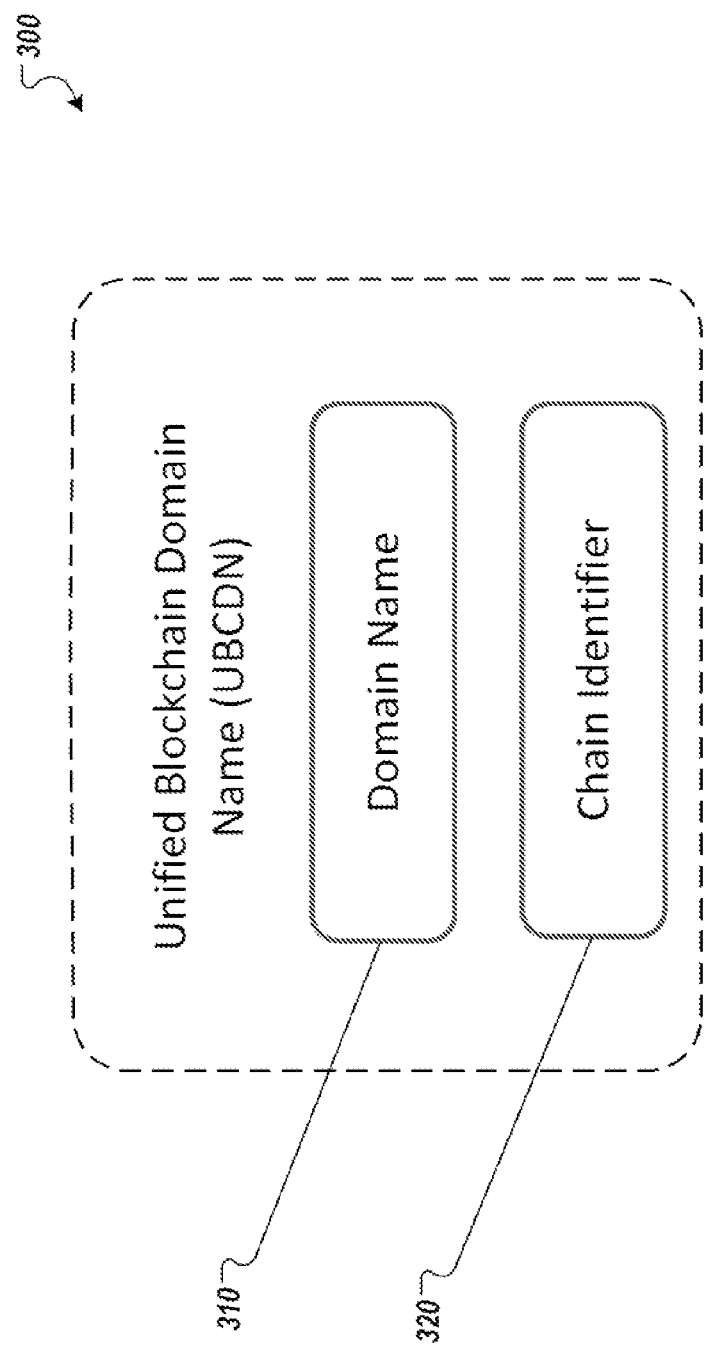
FIG. 3 depicts an example unified blockchain domain name (UBCDN) of a blockchain instance, in accordance with implementations of the present disclosure.

FIG. 3 depicts an example unified blockchain domain name (UBCDN) 300 of a blockchain instance, in accordance with implementations of the present disclosure. The UBCDN 300 can include a blockchain domain name 310 and a corresponding chain identifier 320 of the blockchain instance. The blockchain domain name 310 can be human-readable label. The chain identifier 320 can indicate a blockchain network configuration of the blockchain instance and allow access to the blockchain instance based on the blockchain network configurations. In some implementations, the UBCDN 300 can include additional fields or be represented as a string or another data structure.

The blockchain domain name 310 can be user-friendly. For example, the blockchain domain name 310 can be a text-based label that is easier to memorize than the corresponding numerical chain identifier 320 (e.g., a 40 character hex address used in the Ethereum protocols. In some implementations, the blockchain domain name 310 can be represented as a string or another data structure.

In some implementations, the blockchain domain name 310 can have defined syntax to further facilitate understanding of the source, ownership, or organization of the underlying blockchain instance. For example, the blockchain domain name 310 can be designed in a similar manner to the domain name in the IP network. The blockchain domain name 310 can include one or more parts or labels. The one or more labels can be concatenated and have a hierarchy of domains descending from the right to the left label in the name. Each label to the left specifies a subdivision or subdomain of the domain to the right. For example, a blockchain domain name 310 of chain1.organization1 indicates that the underlying blockchain instance chain1 is a subdomain of the organization1 domain and belongs to the organization1. In some implementations, the blockchain domain name 310 can define additional or different syntax.

The chain identifier 320 can include an addressable identifier that is used to address and access the blockchain instance in the blockchain network. The chain identifier 320 can indicate a blockchain network configuration of the blockchain instance and allow access to the blockchain instance based on the blockchain network configurations. For example, multiple blockchain instances can be deployed based on Ethereum technology. The blockchain instance can be, for example, a mainnet chain, a testing chain, a private chain, or a consortium chain. An Ethereum client can establish a connection with an Ethereum blockchain instance by loading the genesis block (i.e., the first block) of the Ethereum blockchain instance. The genesis block is equivalent to a unique identifier of the Ethereum blockchain instance. Accordingly, in some implementations, one or more fields (e.g., a hash value) of the genesis block of an Ethereum blockchain instance can be extracted as the chain identifier 320 of the Ethereum blockchain instance. In some implementations, the chain identifier of a blockchain instance can include a hash value of a genesis block of the blockchain instance, as well as a network ID that identifies the blockchain instance. In some implementations, the network ID allows transactions on the blockchain instance to look different from those on other chains, for example, by signing transactions differently, depending on the network ID used. As such, the network ID indicates additional network configuration that can be used to link to or otherwise access the blockchain instance. The chain identifier 320 can include additional or different components or fields, for example, depending on the underlying blockchain technology or platform of the blockchain instance.

The UBCDN 300 creates a one-to-one mapping of the blockchain domain name 310 and its corresponding chain identifier 320 of the blockchain instance. Given the blockchain domain name 310, its corresponding chain identifier 320 can be translated, resolved, or otherwise identified, and vice versa. As such, a node can access the blockchain instance based on the blockchain network configuration indicated by the chain identifier 320. As an analogy, the blockchain domain name 310 of a blockchain instance is similar to a domain name according to the Domain Name System (DNS) of an Internet Protocol (IP) resource (e.g., example.com) and the chain identifier 320 is similar to the IP address of the IP resource in the IP network.

In some implementations, for a given blockchain domain name 310, its corresponding chain identifier 320 can be translated, resolved or otherwise identified using UBCDN look-up information that is cached or otherwise stored either locally, inside a querying computer, or remotely in the unified blockchain network (e.g., in a central UBCDN server). The UBCDN look-up information can include multiple UBCDN 300, each UBCDN 300 corresponding to multiple blockchain instances. The UBCDN look-up information can be stored, for example, in a look-up table or another data structure. One or more nodes (e.g., a client node, a consensus node, or a relay node) or a server in the unified blockchain network can store UBCDN look-up information. By searching based on UBCDN look-up information, a chain identifier 320 corresponding to a given blockchain domain name 310 can be identified, and vice versa.

When UBCDN information is cached locally, the UBCDN look-up process can be quicker than performing a remote UBCDN look-up, for example, at a remote UBCDN server. In some implementations, in the latter remote UBCDN look-up, a user inputs a blockchain domain name 310, e.g., "chain1.organization1" into an SDK of the computing device of the user (i.e., the client node). The client node sends a request or query that includes the blockchain domain name 310 "chain1.organization1" to a remote UBCDN server, for example, through the Internet off the chain. Upon receiving the request, the remote UBCDN server searches in the UBCDN look-up information for an entry matching the blockchain domain name 310 "chain1.organization1" and identifies the chain identifier 320 corresponding to the blockchain domain name 310. Then the remote UBCDN server responds to the client node with the chain identifier 320 corresponding to the blockchain domain name 310, for example, by sending a response including the chain identifier 320 corresponding to the blockchain domain name 310 to the client node.

Figure 4:
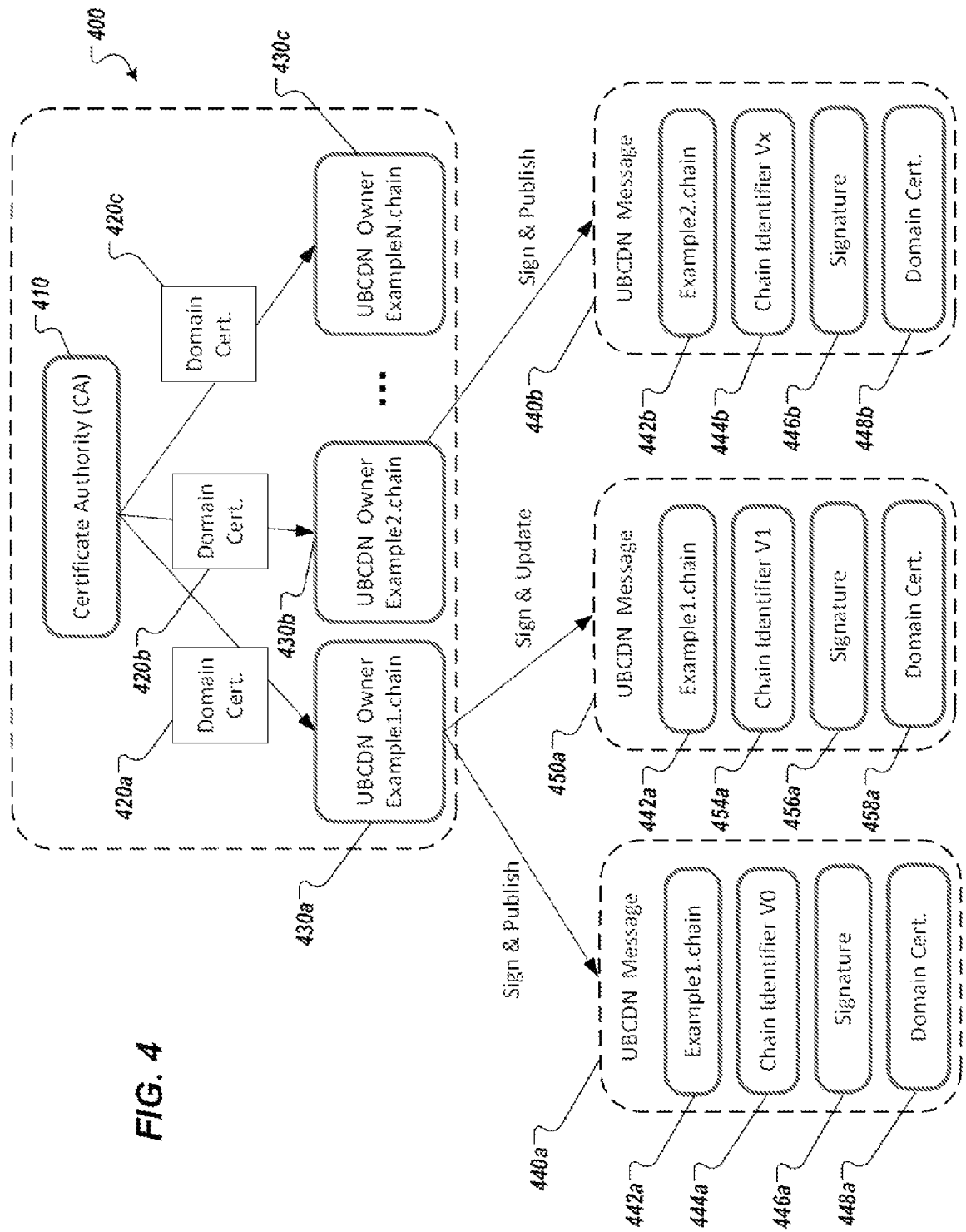
FIG. 4 depicts an example UBCDN management scheme in a unified blockchain network, in accordance with implementations of the present disclosure.

FIG. 4 depicts an example UBCDN management scheme 400 in a unified blockchain network, in accordance with implementations of the present disclosure. The example UBCDN management scheme 400 can provide enhanced trust and security for cross-chain communications based on the UBCDN. In some implementations, the example UBCDN management scheme 400 relies on a public key infrastructure (PKI) to establish trust in the unified blockchain network.

For example, a certificate authority (CA) 410 (e.g., the operator of the PKI) can be used. The CA 410 issues a domain certificate ("Domain Cert") 420a, 420b, and 420c (collectively, domain certificate 420) to each owner of a UBCDN 430a, 430b, and 430c (collectively, UBCDN owner 430). The UBCDN owner 430 can be, for example, an owner or operator of the blockchain instance. As illustrated, the UBCDN owner 430a is an owner of a blockchain domain name "Example1.chain," the UBCDN owner 430b is an owner of a blockchain domain name "Example2.chain," and the UBCDN owner 430b is an owner of a blockchain domain name "ExampleN.chain."

In some implementations, the UBCDN owner 430 can obtain a domain certificate 420 by applying to the CA 410 with a certificate signing request (not shown in FIG. 4). In some implementations, the certificate request is an electronic document that contains the blockchain domain name, information of the blockchain instance (e.g., the chain identifier or other network configurations), and a public key of the UBCDN owner 430. Upon verification that the UBCDN owner 430 has the right to administratively manage the blockchain domain name of the blockchain instance, the CA 410 can sign the request, thus producing a public domain certificate 420. In some implementations, the domain certificate 420 can be served to any node (e.g., a client node, a consensus node, or a relay node) that would like to access the underlying blockchain instance of the blockchain domain name (e.g., "Example1.chain") and proves to the node that the CA 410 trusts and has issued a certificate to the UBCDN owner 430.

The domain certificate 420 can include a blockchain domain name (e.g., "Example1.chain") and a public key of the UBCDN owner 430. The UBCDN owner 430 is the private key holder corresponding to the public key. The CA 410 can digitally sign the blockchain domain name and the public key of the UBCDN owner 430 using the CA's own private key. The domain certificate 420 can include the digital signature signed by the CA 410 on the blockchain domain name and the public key of the UBCDN owner 430.

As described with respect to FIG. 3, a UBCDN can include a blockchain domain name (e.g., "Example1.chain") and a corresponding chain identifier. The UBCDN owner 430 can publish the UBCDN and sign the UBCDN using the private key of the UBCDN owner 430. In some implementations, the UBCDN owner 430 publishes one or more UBCDN messages (e.g., UBCDN messages 440a, 450a, 440) so that the UBCDN can be authenticated or verified.

In some implementations, the UBCDN messages 440 can include the UBCDN, a digital signature of the UBCDN resulting, and a domain certificate. The domain certificate can be the respective domain certificate 420 received from the CA 410. The UBCDN can include the blockchain domain name and the chain identifier (e.g., the blockchain domain name 310 and the chain identifier 320, as described with respect to FIG. 3). As illustrated, the UBCDN owner 430a issues a UBCDN message 440a that includes the blockchain domain name 442a "Example1.chain" and a corresponding chain identifier 444a "Chain Identifier V0," a digital signature 446a, and a domain certificate 448a. The domain certificate 448a can be the domain certificate 420a issued by the CA 410 and received by the UBCDN owner 430a from the CA 410. The digital signature 446a can result from the UBCDN owner 430a's signing of the UBCDN (that is, the blockchain domain name 442a "Example1.chain" and a corresponding chain identifier 444a "Chain Identifier V0" in this case) using the UBCDN owner 430a's private key.

Similarly, the UBCDN owner 430b issues a UBCDN message 440b that includes the blockchain domain name 442b "Example2.chain" and a corresponding chain identifier 444b "Chain Identifier Vx," a digital signature 446b, and a domain certificate 448b. The domain certificate 448b can be the domain certificate 420b issued by the CA 410 and received by the UBCDN owner 430b from the CA 410. The digital signature 446a can result from the UBCDN owner 430b's signing of the UBCDN (that is, the blockchain domain name 442b "Example2.chain" and a corresponding chain identifier 444a "Chain Identifier V0" in this case) using the UBCDN owner 430b's private key.

In some implementations, an authentication or verification process can be performed, for example, by any node in the unified blockchain network or a third party to verify the validity of a UBCDN based on the UBCDN message. This can ensure security that is important for electronic commerce, especially in connection with mobile payment transactions for cross-chain interactions in blockchain systems.

In some implementations, the authentication or verification process can include, for example, verifying that the blockchain domain name is the same as the blockchain domain name in the domain certificate; verifying that the UBCDN owner (e.g., the UBCDN owner 430a) is the holder of the blockchain domain name (e.g., "the blockchain domain name 442a "Example1.chain") by verifying the digital signature on the UBCDN (e.g., the digital signature 446a) using the public key in the domain certificate (e.g., the domain certificate 420a) issued by the CA 410, and verifying that the domain certificate (e.g., the domain certificate 448a) is issued by the trusted CA 410.

In some implementations, after verifying the validity of the UBCDN, for example, based on the authentication or verification process, a client node can use the UBCDN for cross-chain interactions in the unified blockchain network. For example, the client node can receive and read a UBCDN message, verify the validity or legality of UBCDN and confirm that the UBCDN is issued by the owner of the UBCDN; and then use the UBCDN to uniquely identify and access the blockchain instance, for example, by identifying the chain identifier corresponding to the blockchain domain name in the UBCDN.

Figure 5:
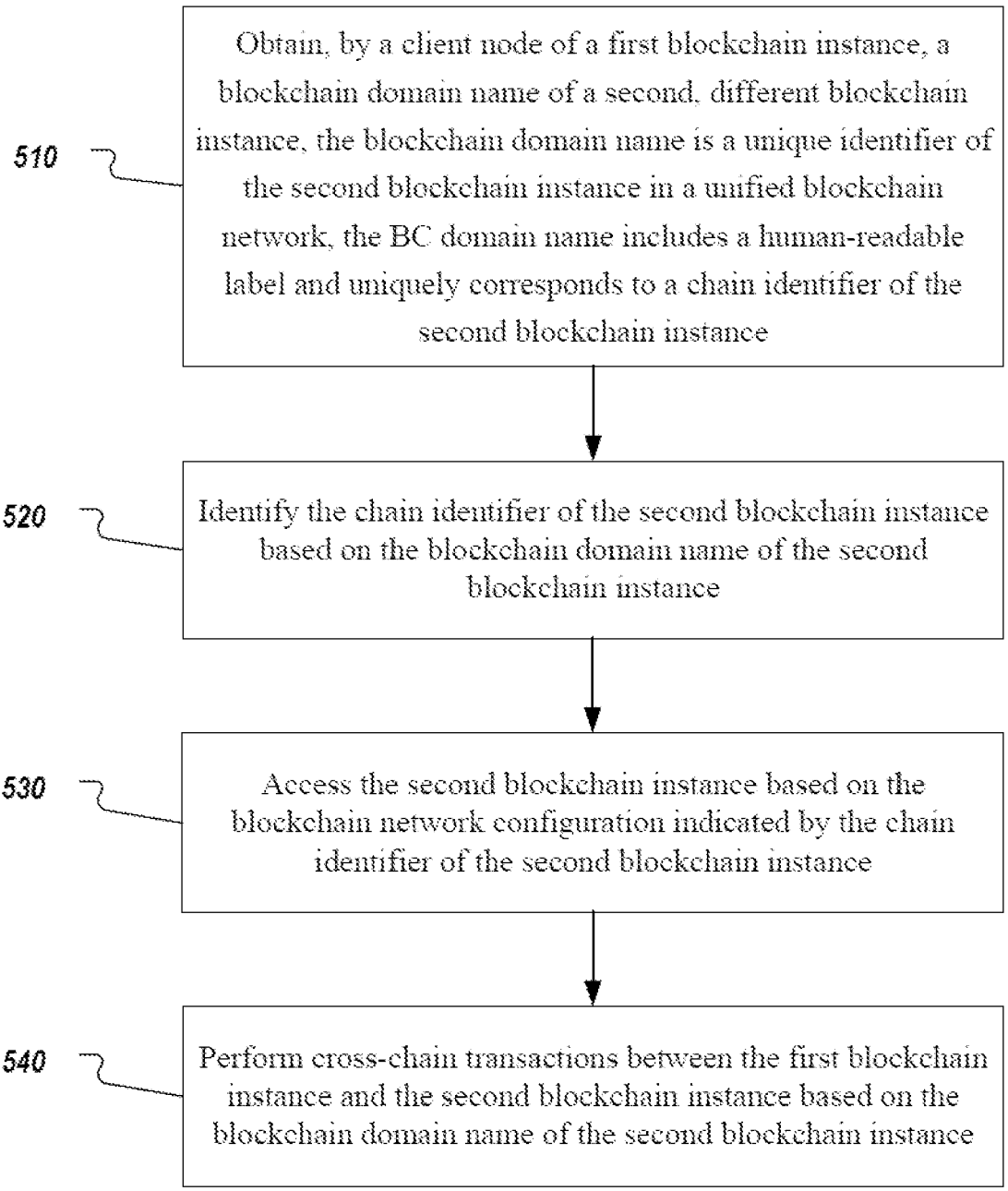
FIG. 5 depicts an example process for using a blockchain domain name of a blockchain instance for cross-chain interactions in a unified blockchain network, in accordance with implementations of the present disclosure.

FIG. 5 depicts an example process 500 for using a blockchain domain name of a blockchain instance for cross-chain interactions in a unified blockchain network, in accordance with implementations of the present disclosure. In some implementations, the example process 500 may be performed using one or more computer-executable programs executed using one or more computing devices. For clarity of presentation, the description that follows generally describes process 500 in the context of the other figures in this description. For example, the example process 500 can be executed by a client node of a first blockchain instance, such as, the computing system 106 or 108 of the consortium blockchain network 102 as described with respect to FIG. 1, or the node 214 of the blockchain network 212 as described with respect to FIG. 2. However, it will be understood that process 500 may be performed, for example, by any suitable system, environment, software, and hardware, or a combination of systems, environments, software, and hardware, as appropriate. In some implementations, various steps of process 500 can be run in parallel, in combination, in loops, or in any order.

At 510, a client node of a first blockchain instance obtains a blockchain domain name of a second, different blockchain instance. In some implementations, the first blockchain instance and the second blockchain instance are deployed based on different blockchain platforms. In some implementations, the first blockchain instance and the second blockchain instance belong to different owners or operators. The first blockchain instance and the second blockchain instance are in a unified blockchain network including a number of blockchain instances that are communicatively linked by two or more relays.

The blockchain domain name is a unique identifier of the second blockchain instance in the unified blockchain network, even though the unified blockchain network includes two or more relays. In some implementations, each of the number of blockchain instances in the unified blockchain network has only one blockchain domain name that uniquely identifies the each of the number of blockchain instances in the unified blockchain network.

The blockchain domain name includes a human-readable label. In some implementations, the human-readable label includes a text-based label. The blockchain domain name uniquely corresponds to a chain identifier of the second blockchain instance. The blockchain domain name and the chain identifier can be represented by a UBCDN such as UBCDN 300, as described in FIG. 3. As an example, the blockchain domain name can be the blockchain domain name 310, while the chain identifier can be the corresponding chain identifier 320 in the UBCDN 300.

At 520, the client node of the first blockchain instance identifies the chain identifier of the second blockchain instance based on the blockchain domain name of the second blockchain instance, wherein the chain identifier of the second blockchain instance indicates a blockchain network configuration of the second blockchain instance. In some implementations, the chain identifier of the second blockchain instance includes a hash value of a genesis block of the second blockchain instance and a network identifier of the second blockchain instance, for example, as described within respect to FIG. 3.

In some implementations, identifying the chain identifier of the second blockchain instance based on the blockchain domain name includes identifying the chain identifier of the second blockchain instance according to look-up information locally stored at the client node based on the blockchain domain name.

In some implementations, identifying the chain identifier of the second blockchain instance based on the blockchain domain name includes identifying the chain identifier of the second blockchain instance from a remote unified blockchain domain name server based on the blockchain domain name. For example, the client node of the first blockchain instance sends a request or query to the unified blockchain domain name server. The request includes the blockchain domain name for identifying the chain identifier of the second blockchain instance. Then the client node of the first blockchain instance receives, from the unified blockchain domain name server, a response to the request, wherein the response includes the chain identifier of the second blockchain instance.

At 530, the client node of the first blockchain instance accesses the second blockchain instance based on the blockchain network configuration indicated by the chain identifier of the second blockchain instance. For example, the first blockchain instance accesses the second blockchain instance via a client node of the second blockchain instance based on the hash value of the genesis block of the second blockchain instance indicated by the chain identifier of the second blockchain instance. In some implementations, the first blockchain instance accesses the second blockchain instance via a client node of the second blockchain by using a relay (e.g., a relay node or a relay chain) or other application that is communicatively linked to both the first blockchain instance and the second blockchain instance.

In some implementations, to access and obtain data from the second blockchain instance, the client node of the second blockchain instance can configure a network configuration such as an IP address and a port number of a node (e.g., a consensus node) of the second blockchain, and the hash value of the genesis block of the second blockchain instance. The client node of the second blockchain instance can connect to the node of the second blockchain instance through the IP address and the port number of the node of the second blockchain instance. The client node of the second blockchain instance can read, retrieve, download, or otherwise obtain the data of the node of the second blockchain instance and verify whether the obtained data come from the second blockchain instance, for example, based on a Simple Payment Verification (SPV) protocol of the second blockchain instance to determine whether the obtained data point to the hash value of the genesis block of the second blockchain instance.

At 540, the client node of the first blockchain instance performs cross-chain transactions between the first blockchain instance and the second blockchain instance based on the blockchain domain name of the second blockchain instance. In some implementations, performing cross-chain transactions between the first blockchain instance and the second blockchain instance includes sending, by the first blockchain instance, a cross-chain request that includes blockchain domain name of the second blockchain instance and a data request, to a relay that is communicatively linked to both the first blockchain instance and the second blockchain instance. The relay receives the cross-chain request and reads the blockchain domain name of the second blockchain instance, loads the corresponding blockchain network configuration of the second blockchain instance, uses the configuration to connect to the second blockchain instance. The rely can retrieve, download, or otherwise receive the requested data from the second blockchain instance, and send the requested data to the first blockchain instance.

Figure 6:
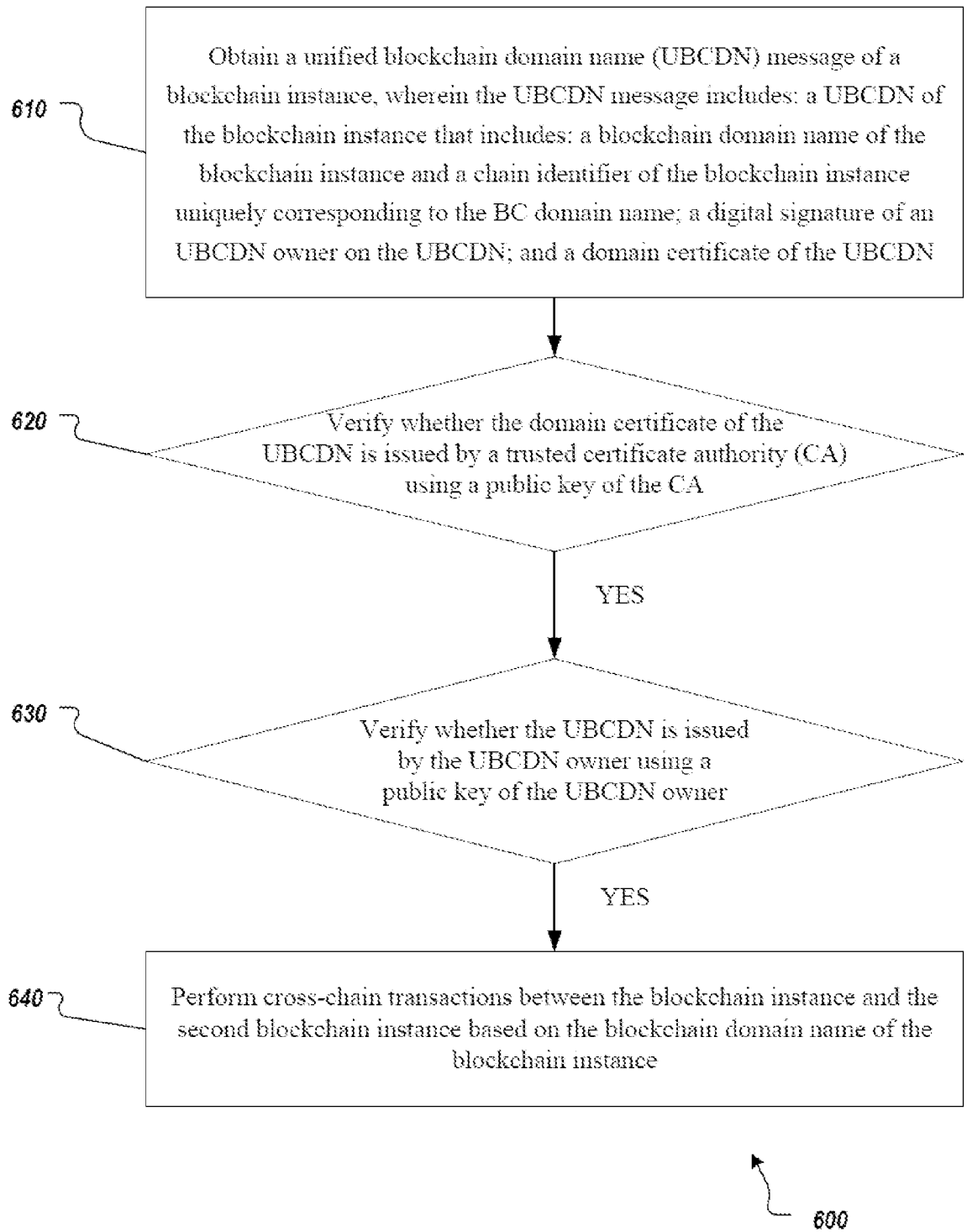
FIG. 6 depicts an example process for authenticating a UBCDN of a blockchain instance, in accordance with implementations of the present disclosure.

FIG. 6 depicts an example process 600 for authenticating a UBCDN of a blockchain instance, in accordance with implementations of the present disclosure. In some implementations, the example process 600 may be performed using one or more computer-executable programs executed using one or more computing devices. For clarity of presentation, the description that follows generally describes process 600 in the context of the other figures in this description. For example, the example process 600 that can be executed by the computing system 106 or 108 of the consortium blockchain network 102, as described with respect to FIG. 1, or the node 214 of the blockchain network 212, as described with respect to FIG. 2. However, it will be understood that process 600 may be performed, for example, by any suitable system, environment, software, and hardware, or a combination of systems, environments, software, and hardware, as appropriate. In some implementations, various steps of process 600 can be run in parallel, in combination, in loops, or in any order.

At 610, a computing system obtains a unified blockchain domain name (UBCDN) message of a blockchain instance. In some implementations, the computing system is a third party of unified blockchain network. In some implementations, the computing system is a client node of a second blockchain instance different from the blockchain instance in the unified blockchain network.

The UBCDN message can be, for example, the UBCDN message 440 as described with respect to FIG. 4. The UBCDN message includes a UBCDN of the blockchain instance, a digital signature of an UBCDN owner on the UBCDN; and a domain certificate of the UBCDN.

The UBCDN of the blockchain instance includes a blockchain domain name of the blockchain instance, wherein the blockchain domain name is a unique identifier of the blockchain instance in a unified blockchain network including a number of blockchain instances that are communicatively linked by two or more relays. The blockchain domain name includes a human-readable label and a chain identifier of the blockchain instance uniquely corresponding to the blockchain domain name.

In some implementations, the domain certificate of the UBCDN includes the blockchain domain name of the blockchain instance, the public key of the UBCDN owner, and a digital signature of the CA on the blockchain domain name of the blockchain instance and the public key of the UBCDN owner.

At 620, the computing system verifies whether the domain certificate of the UBCDN is issued by a trusted certificate authority (CA) using a public key of the CA. In some implementations, the digital signature of the CA is obtained by the CA signing on the blockchain domain name of the blockchain instance and the public key of the UBCDN owner using a private key of the CA corresponding to the public key of the CA. In some implementations, verifying whether the domain certificate of the UBCDN is issued by a trusted CA using a public key of the CA includes verifying that the domain certificate of the UBCDN is issued by the CA using the domain certificate, the digital signature of the CA, and the public key of the CA.

At 630, in response to verifying that the domain certificate of the UBCDN is issued by the CA, the computing system verifies whether the UBCDN is issued by the UBCDN owner using a public key of the UBCDN owner. In some implementations, the digital signature of the owner of the UBCDN is obtained by the owner of the UBCDN singing the UBCDN using a private key corresponding to the public key of the owner of the UBCDN. In some implementations, verifying whether the UBCDN of the blockchain instance is issued by the UBCDN owner using a public key of the owner of the UBCDN includes verifying that the UBCDN is issued by the owner of the UBCDN using the UBCDN, the digital signature of the owner of the UBCDN, and the public key of the owner of the UBCDN. For example, the owner of the UBCDN can sign the UBCDN using the owner's private key and generate a digital signature, for example, according to a signing algorithm. The computing system as a recipient of the UBCDN message can determine whether the UBCDN is issued by the UBCDN owner using the UBCDN, the digital signature, and the public key of the owner, for example, according to a signature verifying algorithm.

At 640, in response to verifying that the UBCDN is issued by the UBCDN owner, the computing system performs cross-chain transactions between the blockchain instance and the second blockchain instance based on the blockchain domain name of the blockchain instance, for example, according to the example process 500 as described with respect to FIG. 5.

Figure 7:
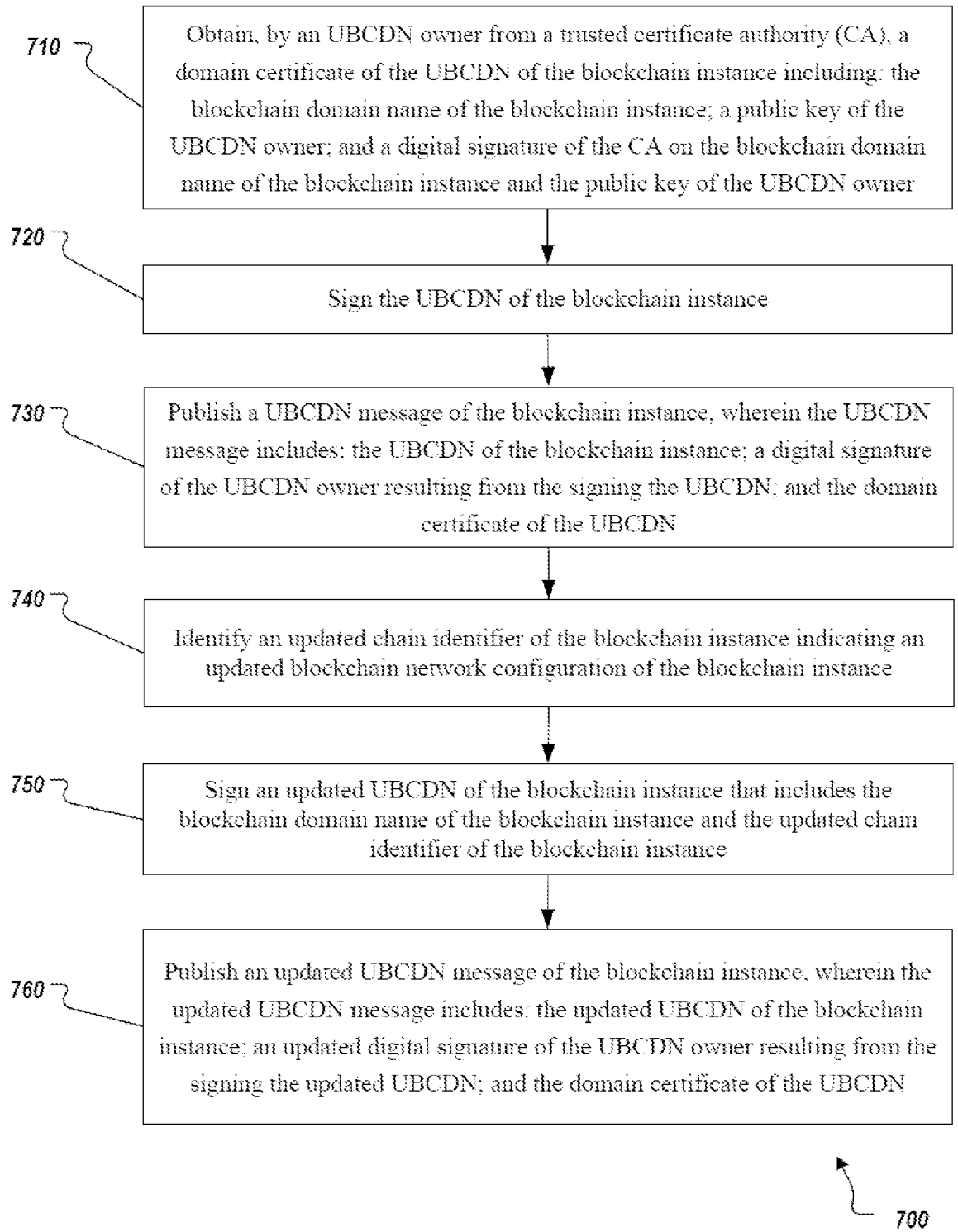
FIG. 7 depicts an example process of an owner of a UBCDN of a blockchain instance (a UBCDN owner), in accordance with implementations of the present disclosure.

FIG. 7 depicts an example process 700 of an owner of a UBCDN of a blockchain instance (a UBCDN owner), in accordance with implementations of the present disclosure. In some implementations, the example process 700 may be performed using one or more computer-executable programs executed using one or more computing devices. For clarity of presentation, the description that follows generally describes process 700 in the context of the other figures in this description. For example, the example process 700 can be executed by the UBCDN owner 430 as described with respect to FIG. 4. However, it will be understood that process 700 may be performed, for example, by any suitable system, environment, software, and hardware, or a combination of systems, environments, software, and hardware, as appropriate. In some implementations, various steps of process 700 can be run in parallel, in combination, in loops, or in any order.

At 710, an owner of a UBCDN of a blockchain instance (a UBCDN owner, such as the UBCDN owner 430) obtains, from a trusted certificate authority (CA) (e.g., the CA 410), a domain certificate (e.g., the domain certificate 420) of the UBCDN of the blockchain instance. The UBCDN of the blockchain instance includes a blockchain domain name of the blockchain instance and a chain identifier of the blockchain instance uniquely corresponding to the blockchain domain name. The UBCDN can be, for example, the UBCDN 300, as described with respect to FIG. 3. The blockchain domain name is a unique identifier of the blockchain instance in a unified blockchain network including a number of blockchain instances that are communicatively linked by two or more relays. In some implementations, the blockchain domain name includes a human-readable label. The chain identifier indicates a blockchain network configuration of the blockchain instance.

The domain certificate of the UBCDN includes the blockchain domain name of the blockchain instance, a public key of the UBCDN owner, and a digital signature of the CA on the blockchain domain name of the blockchain instance and the public key of the UBCDN owner. The domain certificate of the UBCDN can be, for example, the domain certificate 420, as described with respect to FIG. 4.

At 720, the UBCDN owner signs the UBCDN of the blockchain instance, for example, using the private key of the UBCDN owner, for example, according to a signing algorithm.

At 730, the UBCDN owner publishes a UBCDN message (e.g., the UBCDN message 440*a* or 440*b*) of the blockchain instance. The UBCDN message includes the UBCDN of the blockchain instance, a digital signature of the UBCDN owner resulting from the signing the UBCDN, and the domain certificate of the UBCDN.

At 740, the UBCDN owner identifies an updated chain identifier of the blockchain instance indicating an updated blockchain network configuration of the blockchain instance. For example, a change or update of the blockchain network configuration of the blockchain instance can occur (e.g., due to system update or move of the physical location of one or more computing device such as the genesis block). The chain identifier can be updated to reflect the update of the blockchain network configuration of the blockchain instance (e.g., by updating the hash value of the genesis block of the blockchain instance). For example, as illustrated in FIG. 4, for the same blockchain domain name 442*a* "Example1.chain," the chain identifier 444*a* "Chain Identifier V0" has been updated to a chain identifier 454*a* "Chain Identifier V1", to reflect the change of the blockchain network configuration of the blockchain instance.

At 750, the UBCDN owner signs an updated UBCDN of the blockchain instance, for example, using the private key of the UBCDN owner. The updated UBCDN of the blockchain instance includes the blockchain domain name of the blockchain instance and the updated chain identifier of the blockchain instance. For example, as illustrated in FIG. 4, the updated UBCDN of the blockchain instance includes the same blockchain domain name 442*a* "Example1.chain" and the updated chain identifier 454*a* "Chain Identifier V1."

At 760, the UBCDN owner publishes an updated UBCDN message of the blockchain instance. The updated UBCDN message includes the updated UBCDN of the blockchain instance, an updated digital signature of the UBCDN owner resulting from the signing the updated UBCDN, and the domain certificate of the UBCDN. For example, as illustrated in FIG. 4, the UBCDN owner 430a issues an updated UBCDN messages 450a that includes the blockchain domain name 442a "Example1.chain" and the updated chain identifier 454a "Chain Identifier V1," a digital signature 456a, and a domain certificate 458a. The domain certificate 458a can be the domain certificate 420a issued by the CA 410 and received by the UBCDN owner 430a from the CA 410. The updated digital signature 456a can result from the UBCDN owner 430a's signing of the updated UBCDN (that is, the blockchain domain name 442a "Example1.chain" and the updated chain identifier 454a "Chain Identifier V0" in this case) using the UBCDN owner 430a's private key.

Figure 8:
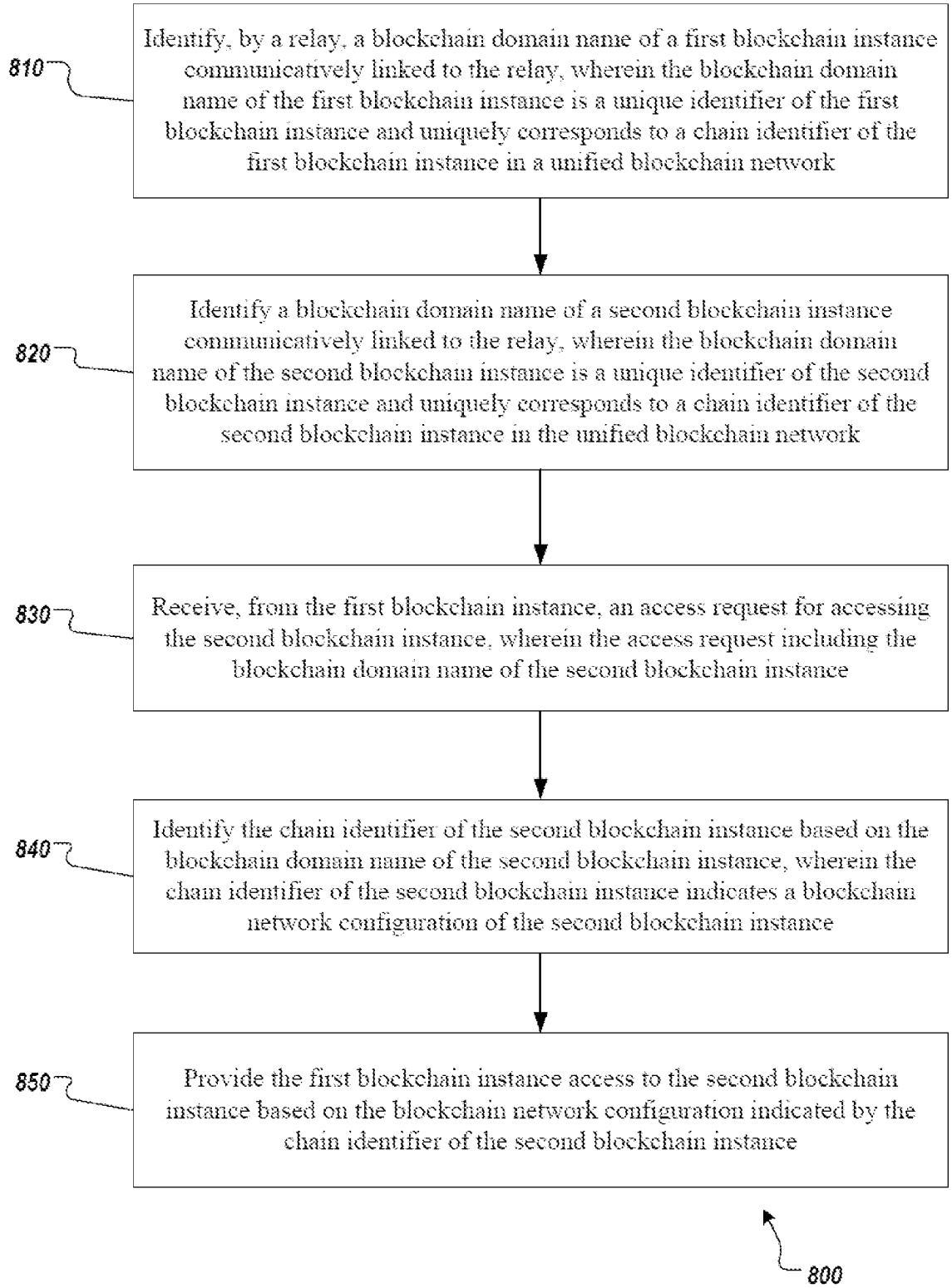
FIG. 8 depicts an example process of a relay for cross-chain interactions in a unified blockchain network, in accordance with implementations of the present disclosure.

FIG. 8 depicts an example process 800 of a relay for cross-chain interactions in a unified blockchain network, in accordance with implementations of the present disclosure. The unified blockchain network includes a number of blockchain instances that are communicatively linked by two or more relays. In some implementations, the example process 800 may be performed using one or more computer-executable programs executed using one or more computing devices. For clarity of presentation, the description that follows generally describes process 800 in the context of the other figures in this description. For example, the example process 800 that can be executed by the relay in a unified blockchain network. However, it will be understood that process 800 may be performed, for example, by any suitable system, environment, software, and hardware, or a combination of systems, environments, software, and hardware, as appropriate. For example, the relay can be a node (e.g., the computing system 106 or 108 as described with respect to FIG. 1 or the node 214 as described with respect to FIG. 2), a blockchain instance (e.g., a blockchain network 102 or the blockchain network 212), or another computer system in the unified blockchain network. In some implementations, various steps of process 800 can be run in parallel, in combination, in loops, or in any order.

At 810, the relay that is communicatively linked with a first blockchain instance and a second blockchain instance in the unified blockchain network identifies a blockchain domain name of a first blockchain instance. The blockchain domain name of the first blockchain instance is a unique identifier of the first blockchain instance and uniquely corresponds to a chain identifier of the first blockchain instance in the unified blockchain network. In some implementations, the blockchain domain name of the first blockchain instance includes a first human-readable label.

At 820, the relay identifies a blockchain domain name of the second blockchain instance. The blockchain domain name of the second blockchain instance is a unique identifier of the second blockchain instance and uniquely corresponds to a chain identifier of the second blockchain instance in the unified blockchain network. In some implementations, the blockchain domain name of the second blockchain instance includes a second human-readable label.

In some implementations, a relay can designate a local identifier for each blockchain that is communicatively linked. The local identifier is designated for the use of the relay and cannot be used by other nodes or relays in the unified blockchain network. In some implementations, identifying a blockchain domain name of the first blockchain instance includes using the blockchain domain name of the first blockchain instance as the local identifier of the first blockchain instance or replacing the local identifier of the first blockchain instance with the blockchain domain name of the first blockchain instance. Similarly, identifying a blockchain domain name of the second blockchain instance includes using the blockchain domain name of the second blockchain instance as the local identifier of the second blockchain instance or replacing the unique identifier of the second blockchain instance with the blockchain domain name of the second blockchain instance.

At 830, the relay receives an access request for accessing the second blockchain instance. The access request includes the blockchain domain name of the second blockchain instance.

At 840, the relay identifies the chain identifier of the second blockchain instance based on the blockchain domain name of the second blockchain instance. The chain identifier of the second blockchain instance indicates a blockchain network configuration of the second blockchain instance.

In some implementations, identifying the chain identifier of the second blockchain instance based on the blockchain domain name of the second blockchain instance includes identifying the chain identifier of the second blockchain instance according to look-up information locally stored at the relay based on the blockchain domain name.

In some implementations, identifying the chain identifier of the second blockchain instance based on the blockchain domain name of the second blockchain instance includes identifying the chain identifier of the second blockchain instance based on the blockchain domain name of the second blockchain instance from a remote unified blockchain domain name server.

At 850, the relay provides access to the second blockchain instance for the first blockchain instance based on the blockchain network configuration indicated by the chain identifier of the second blockchain instance. In some implementations, the relay provides access to the second blockchain instance for the first blockchain instance according to a communication protocol designed for cross-chain interactions. For example, the relay can load the blockchain network configuration indicated by the chain identifier of the second blockchain instance corresponding to the blockchain domain name of the second blockchain instance. The relay uses the blockchain network configuration to connect to the second blockchain instance, obtains a result requested by the first blockchain instance from the second blockchain instance, and returns the result requested by the first blockchain instance to the first blockchain instance, for example, according the example techniques described with respect to FIG. 5.

In some implementations, providing, by the relay, access to the second blockchain instance for the first blockchain instance based on the blockchain network configuration indicated by the chain identifier of the second blockchain instance includes providing, by the relay, access to the second blockchain instance for the first blockchain instance via a second relay.

In some implementations, the blockchain network configuration indicated by the chain identifier of the second blockchain instance is identified by the second relay based on the same chain identifier of the second blockchain instance. In some implementations, the second blockchain instance is accessed by the second relay based on the blockchain network configuration indicated by the chain identifier of the second blockchain instance. In other words, the first blockchain instance can use the same domain name of the second blockchain instance, regardless of which relay is, or how many relays are, used to interact with the second blockchain instance.

In some implementations, the blockchain network configuration indicated by the chain identifier of the second blockchain instance is identified by the second relay according to look-up information locally stored at the second relay based on the same chain identifier of the second blockchain instance.

In some implementations, the blockchain network configuration indicated by the chain identifier of the second blockchain instance is identified by the second relay based on the blockchain domain name of the second blockchain instance from a remote unified blockchain domain name server.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method comprising:
obtaining, by a client node of a first blockchain instance, a blockchain domain name of a second blockchain instance in a unified blockchain network, wherein the unified blockchain network comprises a plurality of blockchain instances that are communicatively linked by two or more relays, the plurality of blockchain instances comprise the first blockchain instance and the second blockchain instance, and each of the plurality of blockchain instances comprises an implementation of a blockchain based on a respective blockchain platform or technology, wherein:
the blockchain domain name is a unique identifier of the second blockchain instance in the unified blockchain network, wherein the blockchain domain name of the second blockchain instance is recognizable globally by all the plurality of blockchain instances and the two or more relays in the unified blockchain network;
the blockchain domain name comprises a human-readable label; and
the blockchain domain name uniquely corresponds to a chain identifier of the second blockchain instance, wherein the chain identifier of the second blockchain instance indicates a blockchain network configuration of the second blockchain instance and allows access to the second blockchain instance based on the blockchain network configuration;
identifying, by the client node, the chain identifier of the second blockchain instance based on the blockchain domain name of the second blockchain instance; and
accessing, by the client node, the second blockchain instance based on the blockchain network configuration indicated by the chain identifier of the second blockchain instance.

2. The method of claim 1, wherein:
- each blockchain instance in the unified blockchain network has a respective blockchain domain name that is a unique identifier of the each blockchain instance in the unified blockchain network, and
- the respective blockchain domain name of the each blockchain instance is recognizable globally by all the plurality of blockchain instances and the two or more relays in the unified blockchain network.

3. The method of claim 1, wherein each of the plurality of blockchain instances in the unified blockchain network has a single blockchain domain name that uniquely identifies the each of the plurality of blockchain instances, regardless of a number of relays in the unified blockchain network.

4. The method of claim 1, wherein the chain identifier of the second blockchain instance comprises a hash value of a genesis block of the second blockchain instance and a network identifier of the second blockchain instance.

5. The method of claim 1, wherein the human-readable label comprises a text-based label.

6. The method of claim 1, wherein identifying the chain identifier of the second blockchain instance based on the blockchain domain name comprises identifying the chain identifier of the second blockchain instance according to look-up information locally stored at the client node based on the blockchain domain name.

7. The method of claim 1, wherein identifying the chain identifier of the second blockchain instance based on the blockchain domain name comprises:
- sending, to a unified blockchain domain name server, a request that includes the blockchain domain name for identifying the chain identifier of the second blockchain instance; and
- receiving, from the unified blockchain domain name server, a response that includes the chain identifier of the second blockchain instance.

8. The method of claim 1, wherein the blockchain domain name of the second blockchain instance remains the same after a change or update of the blockchain network configuration of the second blockchain instance.

9. The method of claim 1, further comprising performing cross-chain transactions between the first blockchain instance and the second blockchain instance based on the blockchain domain name of the second blockchain instance.

10. The method of claim 9, wherein performing cross-chain transactions between the first blockchain instance and the second blockchain instance based on the blockchain domain name of the second blockchain instance comprises:
- sending a cross-chain request to a first relay that is communicatively linked to both the first blockchain instance and the second blockchain instance, wherein the cross-chain request comprises the blockchain domain name of the second blockchain instance and a data request; and
- receiving data requested by the data request, via the first relay, from the second blockchain instance, wherein the first blockchain instance and the second blockchain instance are deployed based on different blockchain platforms.

11. A non-transitory computer-readable storage medium coupled to one or more processors and having instructions stored thereon which, when executed by the one or more processors, cause the one or more processors to perform operations comprising:
- obtaining, by a client node of a first blockchain instance, a blockchain domain name of a second blockchain instance in a unified blockchain network, wherein the unified blockchain network comprises a plurality of blockchain instances that are communicatively linked by two or more relays, the plurality of blockchain instances comprise the first blockchain instance and the second blockchain instance, and each of the plurality of blockchain instances comprises an implementation of a blockchain based on a respective blockchain platform or technology, wherein:
  - the blockchain domain name is a unique identifier of the second blockchain instance in the unified blockchain network, wherein the blockchain domain name of the second blockchain instance is recognizable globally by all the plurality of blockchain instances and the two or more relays in the unified blockchain network;
  - the blockchain domain name comprises a human-readable label; and
  - the blockchain domain name uniquely corresponds to a chain identifier of the second blockchain instance, wherein the chain identifier of the second blockchain instance indicates a blockchain network configuration of the second blockchain instance and allows access to the second blockchain instance based on the blockchain network configuration;
- identifying, by the client node, the chain identifier of the second blockchain instance based on the blockchain domain name of the second blockchain instance; and
- accessing, by the client node, the second blockchain instance based on the blockchain network configuration indicated by the chain identifier of the second blockchain instance.

12. The non-transitory computer-readable storage medium of claim 11, wherein:
- each blockchain instance in the unified blockchain network has a respective blockchain domain name that is a unique identifier of the each blockchain instance in the unified blockchain network, and
- the respective blockchain domain name of the each blockchain instance is recognizable globally by all the plurality of blockchain instances and the two or more relays in the unified blockchain network.

13. The non-transitory computer-readable storage medium of claim 11, wherein each of the plurality of blockchain instances in the unified blockchain network has a single blockchain domain name that uniquely identifies the each of the plurality of blockchain instances, regardless of a number of relays in the unified blockchain network.

14. The non-transitory computer-readable storage medium of claim 11, wherein the blockchain domain name of the second blockchain instance remains the same after a change or update of the blockchain network configuration of the second blockchain instance.

15. The non-transitory computer-readable storage medium of claim 11, the operations further comprising:
- sending a cross-chain request to a first relay that is communicatively linked to both the first blockchain instance and the second blockchain instance, wherein the cross-chain request comprises the blockchain domain name of the second blockchain instance and a data request; and
- receiving data requested by the data request, via the first relay, from the second blockchain instance, wherein the first blockchain instance and the second blockchain instance are deployed based on different blockchain platforms.

16. A system, including:
- one or more computers; and one or more computer-readable memories coupled to the one or more computers and having instructions stored thereon which are executable by the one or more computers to perform operations comprising:

obtaining, by a client node of a first blockchain instance, a blockchain domain name of a second blockchain instance in a unified blockchain network, wherein the unified blockchain network comprises a plurality of blockchain instances that are communicatively linked by two or more relays, the plurality of blockchain instances comprise the first blockchain instance and the second blockchain instance, and each of the plurality of blockchain instances comprises an implementation of a blockchain based on a respective blockchain platform or technology, wherein:

the blockchain domain name is a unique identifier of the second blockchain instance in the unified blockchain network, wherein the blockchain domain name of the second blockchain instance is recognizable globally by all the plurality of blockchain instances and the two or more relays in the unified blockchain network;

the blockchain domain name comprises a human-readable label; and the blockchain domain name uniquely corresponds to a chain identifier of the second blockchain instance, wherein the chain identifier of the second blockchain instance indicates a blockchain network configuration of the second blockchain instance and allows access to the second blockchain instance based on the blockchain network configuration;

identifying, by the client node, the chain identifier of the second blockchain instance based on the blockchain domain name of the second blockchain instance; and accessing, by the client node, the second blockchain instance based on the blockchain network configuration indicated by the chain identifier of the second blockchain instance.

17. The system of claim 16, wherein:

each blockchain instance in the unified blockchain network has a respective blockchain domain name that is a unique identifier of the each blockchain instance in the unified blockchain network, and the respective blockchain domain name of the each blockchain instance is recognizable globally by all the plurality of blockchain instances and the two or more relays in the unified blockchain network.

18. The system of claim 16, wherein each of the plurality of blockchain instances in the unified blockchain network has a single blockchain domain name that uniquely identifies the each of the plurality of blockchain instances, regardless of a number of relays in the unified blockchain network.

19. The system of claim 16, wherein the chain identifier of the second blockchain instance comprises a hash value of a genesis block of the second blockchain instance and a network identifier of the second blockchain instance.

20. The system of claim 16, wherein the blockchain domain name of the second blockchain instance remains the same after a change or update of the blockchain network configuration of the second blockchain instance.

* * * * *